Sept. 3, 1940.　　　　　E. J. RUEB　　　　　2,213,850
BATTERY PLATE
Filed Jan. 30, 1939　　　　2 Sheets-Sheet 1

INVENTOR
Earl J. Rueb.
BY
Arthur L. Brown
ATTORNEY

Sept. 3, 1940.  E. J. RUEB  2,213,850
BATTERY PLATE
Filed Jan. 30, 1939   2 Sheets-Sheet 2
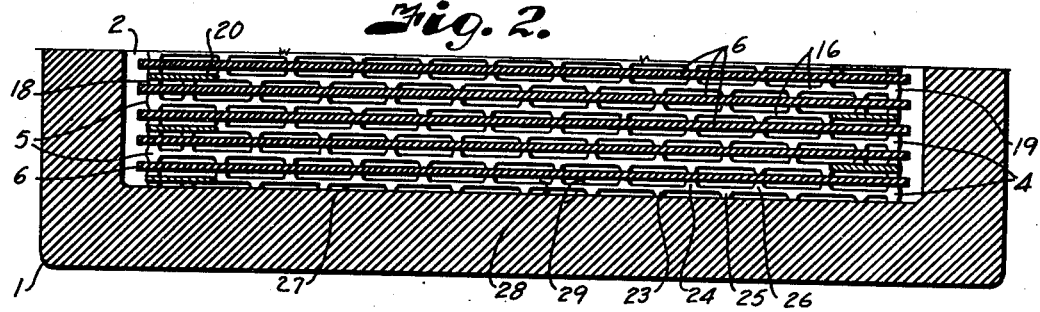
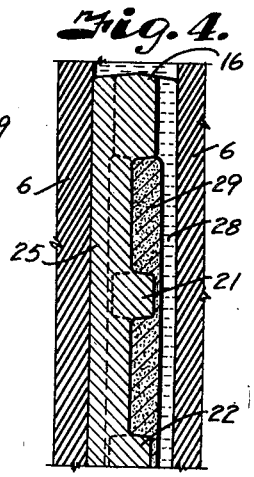
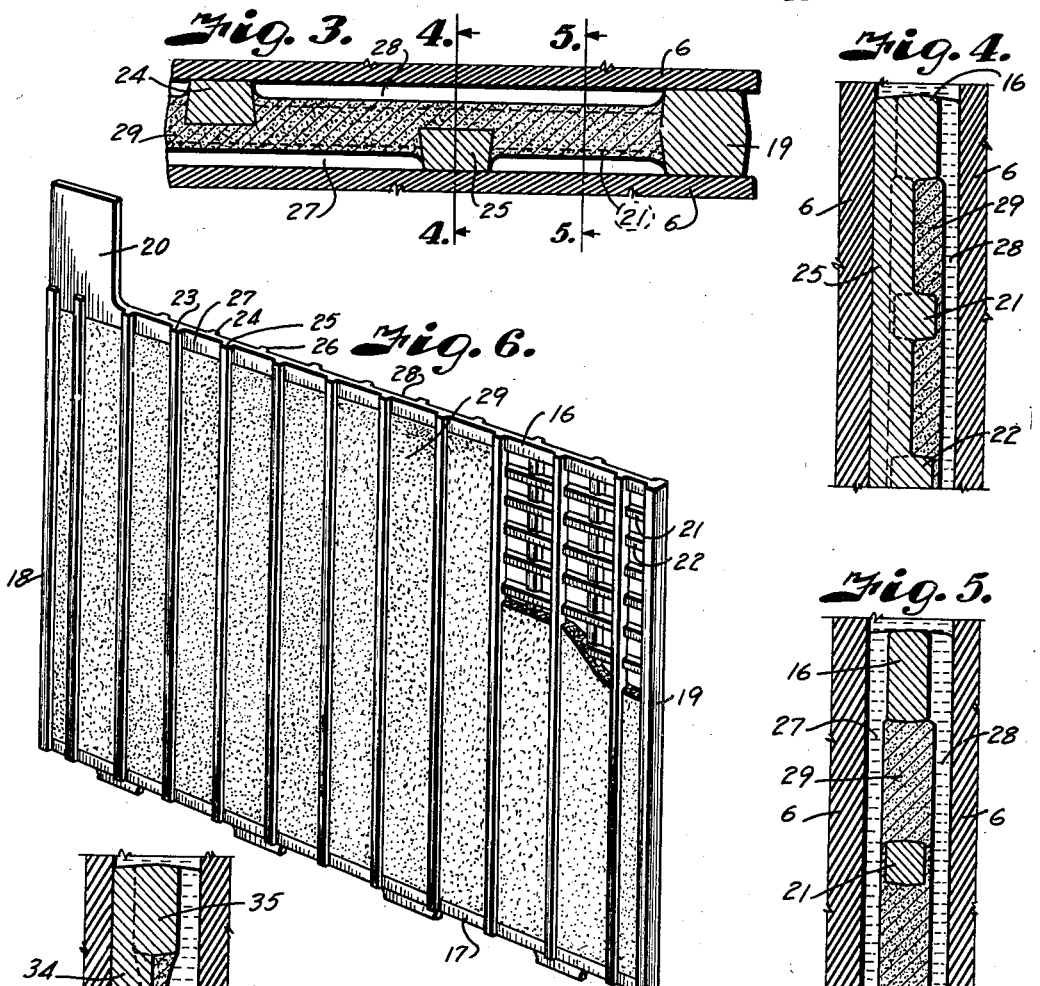
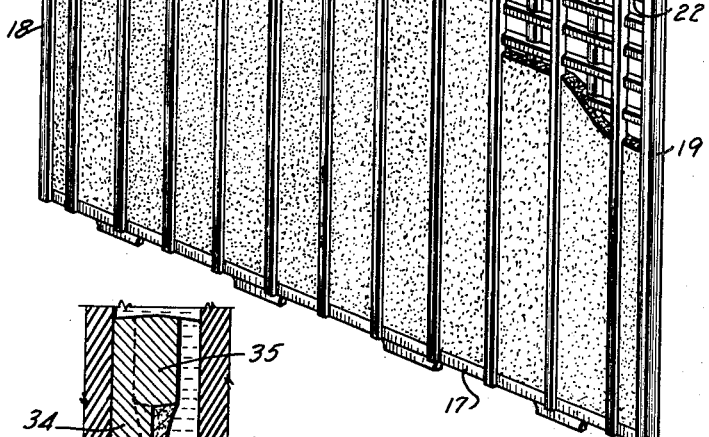
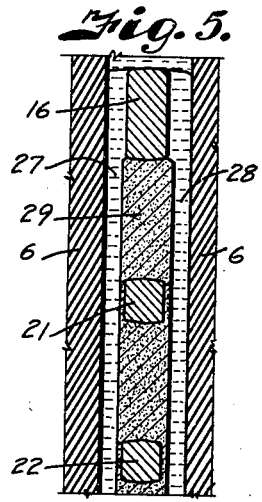
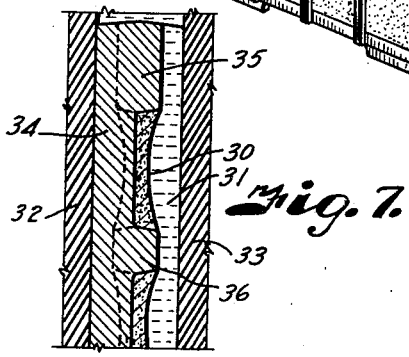
INVENTOR
Earl J. Rueb.
BY Arthur C. Brown
ATTORNEY Patented Sept. 3, 1940

2,213,850

UNITED STATES PATENT OFFICE 2,213,850

BATTERY PLATE

Earl J. Rueb, Oklahoma City, Okla., assignor to Quick Charge Battery Company, Oklahoma City, Okla., a corporation of Oklahoma Application January 30, 1939, Serial No. 253,539

4 Claims. (Cl. 136—48)

This invention relates to storage batteries and more particularly to the plates thereof, the principal object of the prevent invention being to so construct the battery plates as to allow rapid charging of the battery without damage thereto as a consequence of such "quick charge".

The charging rate of batteries, as heretofore constructed, is very limited and other important objects of the present invention are, therefore, to provide a storage battery and particularly battery plates therefor which may be quickly charged to full capacity with high amperage, for example approximately from eighty (80) to ninety (90) amperes and which will take up approximately from two hundred (200) to two hundred fifty (250) amperes in battery charging operations, depending upon the size of batteries being charged; to provide for reducing the time necessary to properly charge batteries from the customary two or three days to approximately from ten to twenty minutes; to provide ribs on the sides of a battery plate for engaging the side surfaces of separators and forming channels between the plate and separators; to provide a battery plate structure which releases all gas and heat created in the battery; to provide a battery plate in which the entire surface of the active material is presented to the electrolyte; to provide an improved battery plate per se, together with improved arrangements of the parts of the plate in relation to each other and to other portions of a battery element; and to provide an efficient and economical battery plate relative to other battery plates heretofore available.

In accomplishing these and other objects of the present invention, I have provided improved details of structure, the preferred form of which is illustrated in the accompanying drawings, wherein:

Fig. 2 is a detail horizontal cross-section on the line 2—2, Fig. 1, particularly illustrating the arrangement of battery plates and separators in a battery cell.

Fig. 3 is a detail horizontal section through a pair of separators and a battery plate particularly illustrating the arrangement of the active material on the plate.

Fig. 4 is a detail vertical cross-section on the line 4—4, Fig. 3, particularly illustrating the relation of the active material to the channel forming members on the battery plate.

Fig. 5 is a vertical cross-sectional view on the line 5—5, Fig. 4, taken between channel forming members of the battery plate.

Fig. 6 is a detail perspective view of a battery plate embodying the features of the present invention, portions of the active material being broken away to particularly illustrate the construction of the grid.

Fig. 7 is a horizontal section through a battery plate embodying the features of the present invention, the active material being shown as provided with concaved surfaces to increase the contacting area thereof relative to the electrolyte.

Figure 1:
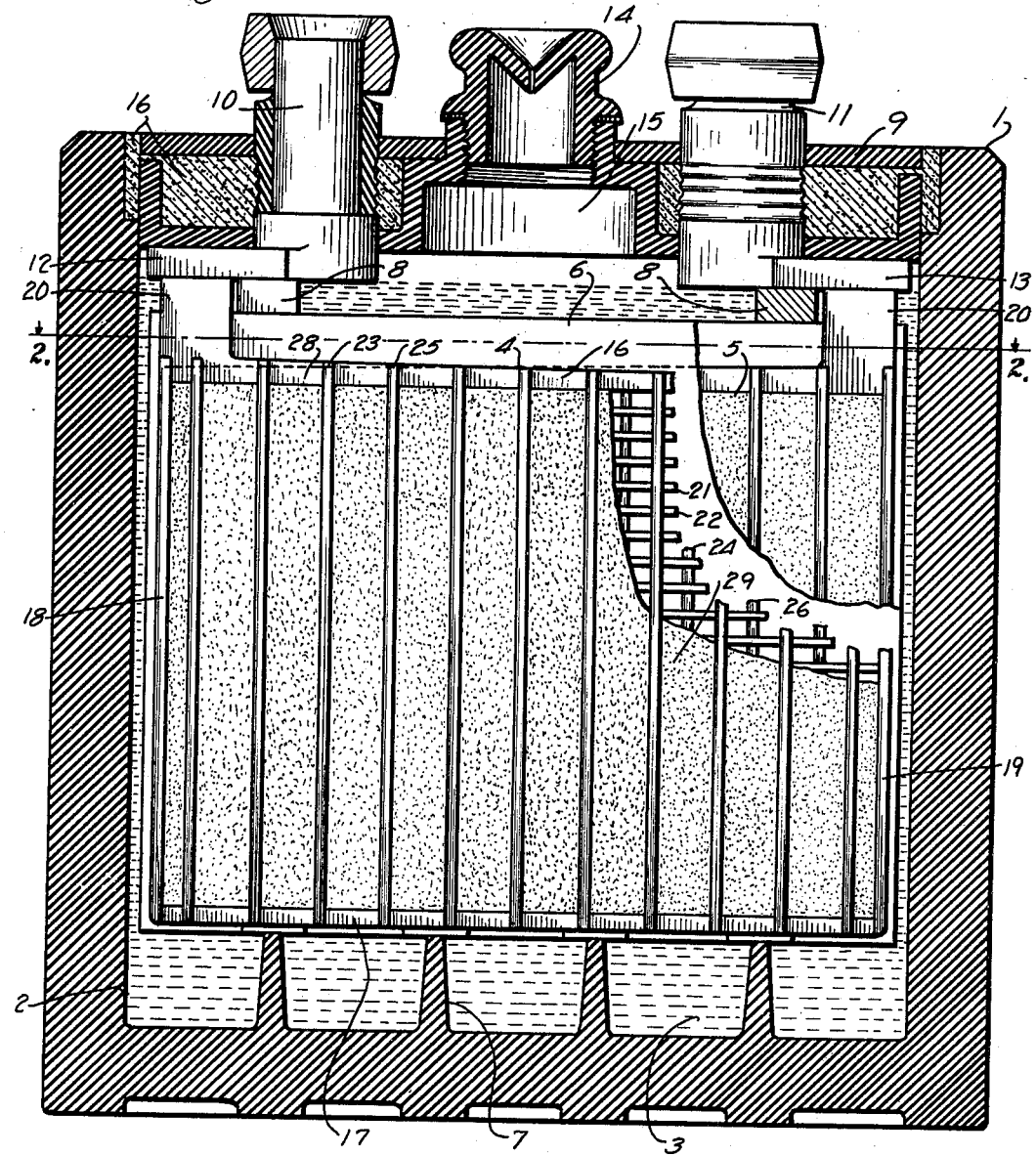
Fig. 1 is a vertical sectional view through a battery cell, parts of a battery plate and adjacent separator being broken away to better illustrate the construction of the battery plate particularly, and the battery element generally.

Referring more in detail to the drawings:

1 designates a battery cell provided with the customary jar 2 having a compartment arranged to contain electrolyte 3, battery plates 4 and 5, and separators 6, the battery plates and separators being supported by the usual bridge 7. Separator retainers 8 are also provided as in conventional practice as well as a cover 9 in which is mounted a negative post 10 and a positive post 11, the posts having the usual connecting straps 12 and 13 extending into the interior of the battery cell. A suitable vent and fill device 14 is also provided above an expansion chamber 15 in the jar and a sealing compound 16 is suitably inserted in the cell cover for the usual purpose.

The usual arrangement of battery plates in a cell of this character is an alternate placement of negative plates 4 and positive plates 5 with a separator interposed therebetween substantially in contact therewith, each of the plates being suitably connected with their corresponding battery post connecting straps.

The separators 6 may be of any suitable type, but I prefer to form them with plane side surfaces, a suitable material being either porous wood or hard rubber.

It is known that when a battery is being charged, the elestrolyte reacts with active material on the battery plates to produce heat and gases, which, if not dissipated, cause excessive pressures to warp the separators and plates and crack or otherwise disintegrate the active material on the plates. As above indicated, the present invention provides an efficient manner of dissipating heat and gases formed during battery charging operations to the end that excessive heat and gases are not built up. Thus, when the deteriorating influences are prevented from occurring, the battery charging operations may be carried on at high speed.

In Fig. 6, the details of the battery plate embodying features of the present invention are shown. This battery plate preferably consists of a frame of substantially rectangular shape formed of an acid resisting, conducting material. The frame further preferably consists of a top member 16, a bottom member 17, and a pair of opposed end members 18 and 19 interconnected with opposite ends of the top and bottom members to form an integral unit. A lug 20 is provided at one end of the top member 16 for connecting with one of the connector straps on the battery posts in a cell.

The battery plates preferably also comprise a series of spaced substantially horizontal parallel cross members 21 and 22 interconnecting the end members 18 and 19. The horizontal cross-members 21 and 22 and the top and bottom members preferably are of a thickness less than the end members 18 and 19 and arranged intermediate the width or thickness of said end members. The battery plates also preferably comprise spaced substantially parallel vertically arranged cross members 23, 24, 25 and 26 on opposite sides of the top and bottom members. As illustrated, the vertically arranged parallel cross members preferably extend throughout the height of the plate, inclusive of the top and bottom frame members, and project laterally therefrom to form channels 27 and 28 therebetween on opposite sides of the battery plate grid. The vertically arranged cross members also contact the horizontally arranged cross members to form an internal conductive framework for the plate capable of receiving and supporting active material 29 on the internal framework so formed.

The active material supported by the grid to form the battery plates may consist of suitable compounds. For example, the active material on the negative plates may consist principally of a compound of litharge while peroxide of lead may be the principal material provided for the positive plates.

As a matter of practice, the vertically arranged cross members are preferably mounted in staggered relation on opposite sides of the frame and are each of a thickness sufficient to align the outer faces thereof with planes defined by the oppositely disposed outer faces of the end members so as to support the separators and plates at points spaced across the face of the plate.

The active material may be suitably applied to the grid as for example by pasting or pressing the prepared active material into the grid or by dipping the grid in a solution of said material in accordance with the process and means disclosed in my co-pending application, filed August 15, 1938, Serial No. 224,985. The thickness of the active material is preferably less than the thickness of the end members and/or the over-all thickness of the oppositely disposed vertically arranged cross members.

Channels are thus produced by this arrangement, the active material forming the channel beds, the bounding sides of which are defined by the vertically arranged cross members which contact the separators. The separators do not contact the active material; therefore all the surface of the active material is presented to the electrolyte.

While I have shown in Fig. 6 a preferred form of battery plate and preferably employ the illustrated plate as the negative plates of the battery element, the positive plates, while preferably being of similar grid construction may, if desired, be provided with an additional thickness of active material. In other words, the positive plate is not necessarily provided with through channels from top to bottom of its frame.

Furthermore, as an alternative arrangement, the active material may be suitably applied to a grid formed in accordance with the present invention as, for example, by painting, dipping or the like to form concaved surfaces 30, as in Fig. 7, to increase the available area of active material in contact with electrolyte 31. Channels are thus formed between separators 32 and 33 on opposite sides of a vertically arranged cross member 34 interconnecting the top member 35 with a horizontally arranged cross member 36 in much the same manner as the preferred form of invention.

In charging a battery, the cells of which are constructed substantially as described, an electrical current of approximately eighty (80) to ninety (90) amperes, and in some cases even as high as approximately from two hundred (200) to two hundred fifty (250) amperes depending upon the size of the battery may be applied to the negative post 10 of the battery cell to recharge the battery. A substantial amount of heat is generated in the cell due to the application of such amperage which ordinarily would be detrimental to the battery. As recharging takes place in the present cell, gases are formed by the reactions taking place; however the gases are quickly dissipated by passage to the surface of the electrolyte because of the provision of the channels between the vertically arranged cross members throughout the total height of the battery plate inclusive of the top and bottom members.

With the construction illustrated, it is apparent that no obstructions prevent circulation of electrolyte particularly between the negative battery plates and the separators. Gas pressures which are increased by the great heat during charging are thus free to pass upwardly in those channels to the expansion chamber above the plates in the cell where they escape through the fill opening.

Since pressures and heat are promptly dissipated from the normally confined spaces between the plates and separators, the plates may withstand the high amperage applied thereto and warping of the plates as well as the separators due to normally excessive pressures is avoided. The battery may thus be given a "quick charge" in approximately from ten to twenty minutes as distinguished from the usual slower treatment requiring approximately two or three days' time and the necessity of removing a battery to be charged from an automobile or like energy using device is also avoided.

It is apparent, therefore, that a battery and particularly a plate therefor, has been provided by the present invention which is capable of efficient normal use and which works the convenience of allowing quick charging thereof without damage thereto.

What I claim and desire to secure by Letters Patent is:

1. In a battery plate, a grid comprising top, bottom and end frame members, substantially horizontal spaced parallel members connecting said end members, said parallel horizontal members being of less thickness than the end members, substantially vertical spaced parallel members connecting said top and bottom members and contacting said spaced horizontal members, the spaced vertical members being of a thickness approximately that of the end members, and active material supported by the horizontal and vertical members, the thickness of the active material being greater than the horizontal members and less than the end and vertical members to form vertical channels from the top to the bottom of the plate.

2. A battery grid including a frame having top, bottom and end members, the end members being thick relative to the top and bottom members, cross members connecting the end members, said cross members being thin relative to the end members, and members connecting said top and bottom members, said last named members projecting laterally of the top and bottom members substantially into the planes of the outer faces of the end members.

3. A battery grid including a substantially rectangular frame having top, bottom and end members, the end members being thick relative to the top and bottom members, cross members connecting the end members, said cross members being thin relative to the end members and being arranged substantially intermediate the thickness of the end members, and alternately arranged members on opposite sides of the first named cross members connecting said top and bottom members and forming channels on opposite sides of the grid.

4. A battery plate including a substantially rectangular grid having top, bottom and end members, the end members being thick relative to the top and bottom members, cross members connecting the end members, said cross members being thin relative to the end members and being arranged substantially intermediate the thickness of the end members, members on opposite sides of the cross members connecting said top and bottom members and projecting laterally therefrom substantially into the planes of the outer faces of the end members, and active material supported by said grid of a thickness greater than the cross members and less than the end members, the last named members extending laterally of portions of the active material to form channels on opposite sides of the plate inclusive of the top and bottom members thereof.

EARL J. RUEB.